United States Patent

Stahl et al.

[11] Patent Number: 6,128,499
[45] Date of Patent: Oct. 3, 2000

[54] METHOD AND DEVICE FOR DETERMINING AND SELECTING FREQUENCIES

[75] Inventors: Wolfgang Stahl; Gerd Zimmermann, both of Eckental, Germany

[73] Assignee: Telefonaktibolaget LM Ericsson, Stockholm, Sweden

[21] Appl. No.: 09/075,316

[22] Filed: May 11, 1998

[30] Foreign Application Priority Data

May 12, 1997 [EP] European Pat. Off. .............. 97107719

[51] Int. Cl.[7] .............................. H04Q 7/36; H04Q 7/30; H04Q 7/34
[52] U.S. Cl. ......................... 455/452; 455/447; 455/448; 455/449; 455/450; 455/62; 455/63
[58] Field of Search ................................... 455/450, 452, 455/446, 447, 449, 509, 62, 63, 448

[56] References Cited

U.S. PATENT DOCUMENTS

| | | | |
|---|---|---|---|
| 5,625,672 | 4/1997 | Yamada .................................... | 455/450 |
| 5,752,192 | 5/1998 | Hamabe .................... | 455/450 |
| 5,828,963 | 10/1998 | Grandhi et al. .......................... | 455/450 |
| 5,884,145 | 3/1999 | Haartsen .................................... | 455/63 |
| 5,898,928 | 4/1999 | Karlsson et al. ......................... | 455/450 |
| 5,901,357 | 5/1999 | D'Avello et al. ....................... | 455/454 |
| 5,920,819 | 7/1999 | Asanuma ................................. | 455/447 |

FOREIGN PATENT DOCUMENTS

| | | |
|---|---|---|
| 96/29832 | 9/1996 | WIPO . |
| 96/30175 | 10/1996 | WIPO . |
| 96/31989 | 10/1996 | WIPO . |

*Primary Examiner*—Daniel S. Hunter
*Assistant Examiner*—Alan T. Gantt
*Attorney, Agent, or Firm*—Burns, Doane, Swecker & Mathis, L.L.P.

[57] ABSTRACT

In two superimposing communication systems using the same frequencies, where the second communication system was not considered in the frequency planning of the first cellular communication system, frequencies are to be allocated to the second communication system in a way that they do not interfere with the first communication system. Accordingly, a medium field strength of each frequency is calculated after a time interval has expired. A number of frequencies are selected in correspondence with the value of the medium field strength. A medium value is formed with the field strengths of the selected number of frequencies. The time interval of the calculation of the medium field strength of each frequency is changed in response to the medium value.

10 Claims, 1 Drawing Sheet

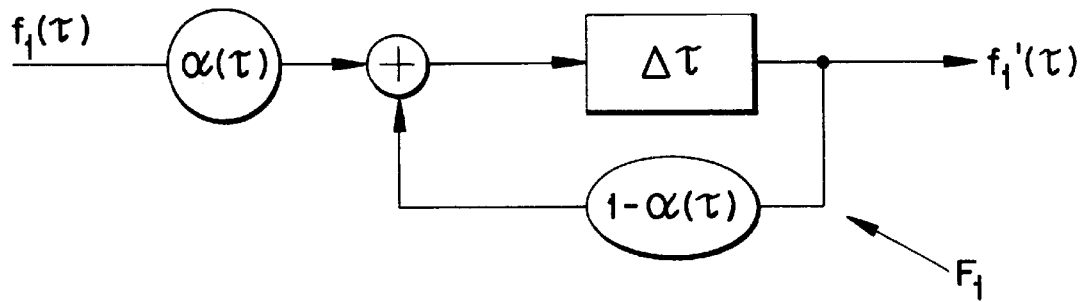
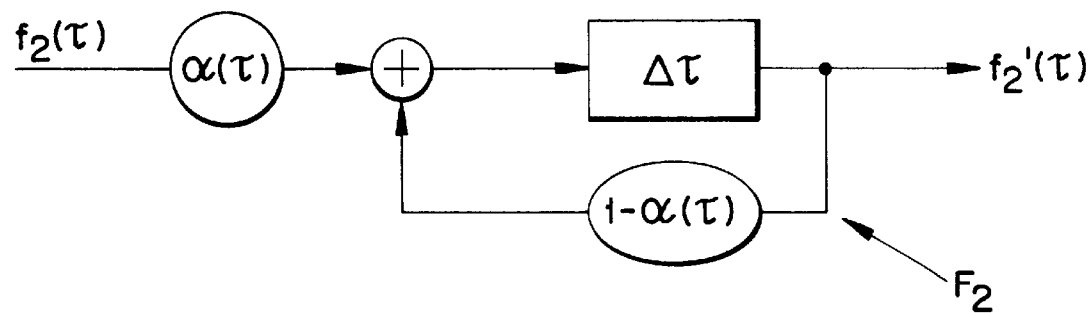
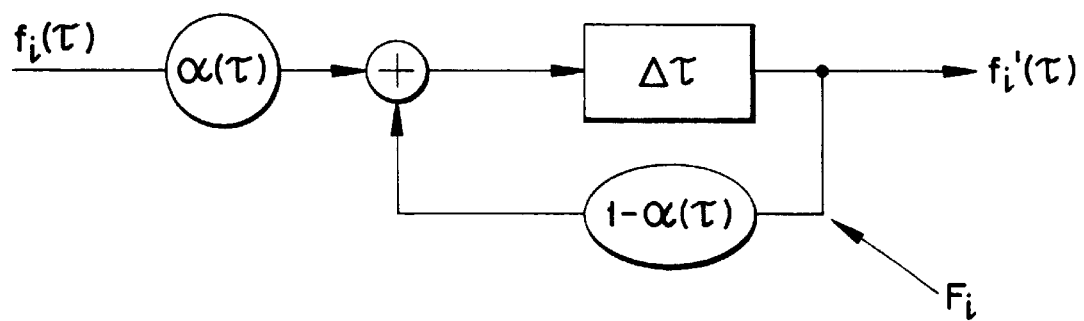

METHOD AND DEVICE FOR DETERMINING AND SELECTING FREQUENCIES

This application claims priority under 35 U.S.C. §§119 and/or 365 to EP 97107719.3 filed in Europe on May 12, 1997; the entire content of which is hereby incorporated by reference.

BACKGROUND

The invention relates to a method and a device for determining and selecting frequencies in at least two superimposing cellular communication systems using the same frequencies. The invention particularly relates to a method and device for allocating frequencies to a cellular communication system by simultaneously avoiding interferences between two superimposing communication systems using the same frequencies.

The prior art discloses two superimposing communication systems, a so-called indoor cellular system and an external cellular system outside a building, whereby the same frequencies are used by both systems. Such an indoor cellular system is also called a parasitic system because it benefits from the external cellular system by using free frequencies of the external system. Said parasitic systems are expected to operate with low field strengths for avoiding or reducing interferences with the superimposed system. According to the prior art a so-called macrocell calculates which channels, i.e. frequencies, are available for further use in the indoor system. It is thereby an essential aspect to determine how and, for example, up to which floor such parasitic system operates. Moreover, the prior art consequently shows that two superimposing cellular systems using the same frequencies can exist and function together, if the communication system has a sufficiently large capacity ("A Simulation Study of Urban In-Building Cellular Frequency Reuse", T. S. Rappaport, R. A. Brickhouse; IEEE Personal Communications, February 1997, page 19 to page 23).

SUMMARY

The above-mentioned prior art shows that two superimposing communication systems using the same frequencies can exist together. In general, it is assumed when providing such systems that a first cellular communication network exists, and that such a first communication network is based on a specific cellular frequency planning. Accordingly it is the object of the present invention to determine and allocate suitable frequencies to an additional communication system which is added to a first communication system and which is not considered in the frequency planning of the first communication system. It is, moreover, an object of the invention to provide frequencies causing a small interference with the superimposing cellular communication system.

According to an advantageous aspect the method and device can easily be implemented and can be adopted to changing environmental conditions in a good and fast manner.

It is another advantageous aspect that only those frequencies are offered to the additional cellular communication system, which do not interfere with or negatively influence the superimposing communication system, and are not even considered an interference or influence by said system.

According to exemplary embodiments of the present invention it is an advantageous aspect that in the case where the time average is underneath a threshold value, the time interval between the determination of the medium field strength is reduced, whereby the reaction time is increased because sufficient frequencies having low field strengths are available and a fast reaction is not necessary. In case where the time average of the field strengths is above a threshold value, the time interval between the determinations of the medium field strengths is increased for enabling a faster reaction on changes and for thereby offering a sufficient number of suitable frequencies.

According to exemplary embodiments of the present invention it is an advantageous aspect that suitable selected frequencies are shown in a list, which as such can easily be transmitted to a mobile station, e.g. a mobile terminal transceiver. According to exemplary embodiments of the present invention further advantageous, that only in the case where one of the values in the list differs from the previous one by a threshold value, the complete list is transmitted to the mobile station.

The invention is in the following explained in more detail by means of embodiments and the FIGURE.

BRIEF DESCRIPTION OF THE DRAWINGS

FIGURE: Illustration of adaptive recursive filters in a device for determining and selecting frequencies.

DETAILED DESCRIPTION

A first cellular communication system is, for example, provided on a specific geographic surface. A certain bandwidth of frequencies is available in said system. At least another cellular communication system is provided within the geographic surface and operates with the same frequencies. The bandwidth of the present frequencies is thus to be used by both systems.

The first cellular communication system is, for example, the public mobile radio system according to the GSM standard or the AMPS standard. A frequency planning according to the known methods takes place in the first cellular communication system. Accordingly, there is a specific allocation of frequencies corresponding to the planning. The additional cellular communication system, e.g. an additional cellular communication network according to the GSM standard or the AMPS standard, or a cellular communication network having the characteristics of a cordless communication system, for example, according to the DECT standard, cannot be integrated into the frequency planning. One reason can be that the additional cellular communication system is set up only later or other methods of frequency allocation are being used. Therefore, the frequency allocation for the additional communication system cannot be effected under the control of the first cellular communication system. For selecting frequencies for the additional communication system a medium field strength $f_1, \ldots, f_i$ is determined for each frequency whereby $i=1,2,\ldots,n$ equal to the number of all possible frequencies, after a time interval has expired. For avoiding interferences between the cellular communication systems, frequencies having a low medium field strength are considered suitable for the additional cellular communication system. Thus, the medium field strength constitutes a degree for the quality of the frequencies i for the use in the additional communication system. Corresponding to the value of the medium field strength of the frequencies a number N of frequencies is selected. In this case, the frequencies having the lowest medium field strengths are, for example, selected. The number N of the frequencies selected can be appointed arbitrarily.

A medium value is formed with number N of the selected frequencies i. In response to the medium value the time interval for the new determination of the medium field strength of each frequency is changed. In the case where the medium value is above a specific threshold, i.e. the selection of frequencies is of bad quality on an average, the time interval for determining the medium field strength of each frequency is reduced. This results in a faster reaction on changes. In the case where the medium value is below a specific threshold value, i.e. the selection of frequencies is of good quality on an average, the time interval for determining the medium field strength of each frequency is increased. In this case a fast reaction time on changes is not required since sufficient suitable frequencies are available.

The selection of the frequencies corresponding to the value of the medium field strength can, for example, be compiled in a list. Such a list is made available to a mobile terminal transceiver for indicating the available suitable frequencies. For avoiding a too frequent and unnecessary new provision in the mobile terminal transceiver, a new list is only transmitted when the medium field strength of at least one of the frequencies differs by more than one threshold value, with the result that this is communicated to the mobile terminal transceiver only when essential changes occur.

In the following it is explained in more detail how a device for determining and selecting frequencies according to the invention is set up (without the FIGURE).

A device for determining and selecting frequencies for at least a second cellular communication system in a first cellular communication system in two superimposing cellular communication systems using the same frequencies comprises means for determining a medium field strength $f_1'(\tau), f_2'(\tau), \ldots, f_i'(\tau)$. For each frequency $i=1,2,\ldots,n$ the value of the medium field strength is respectively determined within a certain time interval.

The device comprises means for selecting a number N of suitable frequencies. The suitable N frequencies are selected in response to the value of the medium field strength. In this respect, for example, those frequencies are selected the medium field strength of which has the lowest values since these are suitable. The number N of the selected frequencies can be set at an arbitrary value.

Moreover, the device comprises means for forming a medium value. In this respect a medium value is formed with the field strengths of the number of the selected frequencies for having an idea about the current selected frequencies and for determining the quality of the selected frequencies. In this respect it is assumed that the quality is good, if the medium value of the field strengths of the selected frequencies is low. It is correspondingly assumed that the quality is bad, if the medium value of the field strengths of the selected frequencies is high. For the purpose of differentiation a threshold value is defined and indicated as threshold value for good or bad quality. Said threshold value does not have to be a discrete value, but can rather be a function. The device furthermore comprises means for changing the time interval for the means for determining the medium field strength for each frequency. In this respect the time interval is increased until the medium field strength of each frequency is determined anew if the quality is high, i.e. if the medium value of the selected frequencies is low, i.e. if it is underneath a threshold value. In the case where the quality is low, i.e. where the medium value is high, the time interval is reduced for permitting a faster reaction on changes.

The device, moreover, comprises means for setting up and providing a list of selected frequencies. In this respect, for example, the frequencies having the lowest medium values of field strength can be summarized and illustrated and transmitted in the form of a list. With the use in cellular communication systems such as a GSM mobile radio network, such a list is set up in the radio base station and transmitted to the mobile terminal transceiver. The list, for example, includes the frequencies by order of the lowest determined values of the field strength. The list is renewed at regular time intervals. The following case can, however, occur. The frequency sequence within the list changes while the frequency values only differ slightly. In this case, however, no new list is to be sent to the mobile terminal transceiver in lack of relevant information for the device. Only in case a change greater than an fixed threshold value occurs is a new list transmitted to the mobile terminal transceiver. In the following an embodiment of the invention is more closely explained by means of the FIGURE.

A device for determining and selecting frequencies preferably consists of an adaptive recursive filter $F_1, F_2, \ldots, F_i$, whereby $i=1,2,\ldots n$ equal to the number of possible frequencies. For each frequency i an adaptive recursive filter $F_1, F_2, \ldots, F_i$, is applied. The medium field strength of each frequency applies at the output of the filter. The device allocates frequencies to the additional cellular communication system by using a so-called adaptive frequency allocation (AFA) algorithm, hereinafter briefly called AFA algorithm. Determined field strength values $f_{i,d}$ in the downlink and $f_{i,u}$ in the uplink serve as the basis for the AFA algorithm. The values $f_{i,d}$ in the downlink and $f_{i,u}$ in the uplink are medium values. For getting a better view, the two values are combined to form one value $f_i$. The time required for measuring the field strength of all frequencies is designated measurement period of length $\Delta\tau$. $\Delta\tau$ is a constant value. $\tau$ refers to the time after the values of the field strength of each frequency have been measured.

A corresponding measured field strength $f_1(\tau), f_2(\tau), \ldots, f_i(\tau)$ applies to the input of each filter $F_1, F_2, \ldots, F_i$, at time $\tau$. Moreover, each filter has a coefficient $\alpha(\tau)$. This coefficient is a so-called event-driven, time-dependent coefficient.

A medium field strength $f_1'(\tau), f_2'(\tau), \ldots, f_i'(\tau)$ of each frequency respectively applies to the output of each filter. The thereby filtered medium field strengths $f_1'(\tau), f_2'(\tau), \ldots, f_i'(\tau)$ are calculated to form $$f_i'(\tau) = \alpha_i(\tau) * f_i(\tau) + (1-\alpha_i(\tau)) * f_i'(\tau-\Delta\tau) \quad (1)$$

with $i=1,2,\ldots,n$
$f_i'(\tau-\Delta\tau)$ designates the medium field strength previously determined in the time period.

It is moreover to be stated that in the case where one of the current measured field strength is greater than a previously determined medium field strength of the same frequency, no filtering takes place. The output value of the filter is then, however, equal to the input value.

The use and effect of the above-explained filter is, for example, as follows. As explained above, the time interval of the determination of the medium field strength of each frequency is changed in response to the medium value being formed with the field strengths of the frequencies selected. This is effected as follows. In the case where the medium value of the medium field strength of the selected frequencies is low, i.e. underneath a threshold value, it is assumed that the quality of the frequencies is good. In this case a long reaction time of the filter on a change is sufficient, which is why the coefficient $\alpha$ is set at a value of almost 0. In the reverse case where the quality is bad, the coefficient $\alpha$ is set at a value of almost 1. The coefficients $\alpha$ of all filters are adjusted to the same value so that all filters operate at the same time intervals.

Exactly defined the coefficient a is calculated as follows.

$$a(\tau) = z\left(\frac{1}{N}\sum_{k}^{N} f'_k(\tau)\right) \quad (2)$$

whereby N is equal to the number of the selected frequencies and z is a value in response to the quality and the threshold value indicating the difference between good and bad quality. z can constitute an arbitrary function, i.e. must not necessarily be a linear function. Accordingly the coefficient a is calculated such that it has the effect of an event-driven, time-dependent coefficient.

It has been explained that the provision of a new list takes place in the case where the value of a medium field strength of a selected frequency of the list differs by more than one threshold value. As explained above there are significant and less significant changes that do not have a great influence. For determining whether or not a change is significant, the previous and the current values have to be compared and a threshold value has to be defined.

A method and a device according to the invention are, for example, applied in two superimposing cellular mobile radio networks For example, a largely extended cellular mobile radio system operating according to the GSM standard is superimposed with an additional, however, geographically restricted mobile radio network. This occurs, for example, if a private mobile radio network is to be superimposed with the public GSM mobile radio network within a city, an area or inside a building.

The method and device can also be used if such public mobile radio network is superimposed with a communication system operating according to a cordless standard, but on the same frequency as the public mobile radio network.

What is claimed is:

1. Method for determining and selecting frequencies for at least a second cellular communication system in first cellular communication system in two superimposing cellular communication systems using the same frequencies, comprising the steps of:

calculating a medium field strength of each frequency after a time interval has expired;

selecting a number of frequencies in correspondence with the value of the medium field strength;

forming a medium value with the field strengths of the selected number of frequencies; and changing the time interval of the calculation of the medium field strength of each frequency in response to the medium value.

2. Method according to claim 1, further comprising the step of:

selecting a number of frequencies having the lowest medium field strengths.

3. Method according to claim 1, further comprising the steps of:

increasing the time interval if the medium value of the field strength of the selected frequencies is underneath a threshold value; and reducing the time interval if the medium value is above the threshold value.

4. Method according to claim 1, wherein a list of selected frequencies is set up and provided to the communication systems.

5. Method according to claim 4, wherein a new list its provided in the case where the value of a medium field strength of a selected frequency of the list differs from the previous one by more than one threshold value.

6. Device for determining and selecting frequencies for at least a second cellular communication system in a first cellular communication system, wherein the first and second cellular communication systems are superimposed and use the same frequencies, the device comprising:

means for determining a medium field strength for each frequency within a time interval;

means for selecting a number of frequencies in correspondence with the value of the medium field strength;

means for forming a medium value of the medium field strength of the selected frequencies;

means for selecting a number of frequencies corresponding to the medium value; and means for changing the time interval between the calculations of the medium field strengths of each frequency in response to the medium value.

7. Device according to claim 6, wherein the means are an adaptive recursive filter for each frequency.

8. Device according to claim 6, further comprising:

means for setting up and providing a selected list of frequencies.

9. Use of the device according to claim 6 for frequency allocation in two superimposing cellular communication systems according to the GSM standard or in two superimposing cellular communication systems according to the DECT standard.

10. Use of the device according to claim 6 for frequency allocation in superimposing cellular communication systems according to GSM standard and in a cellular communication system according to a cordless standard.

* * * * *